Jan. 10, 1961        H. J. B. TOPP        2,967,604

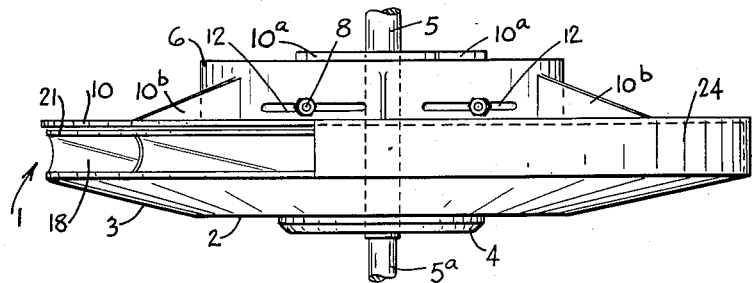
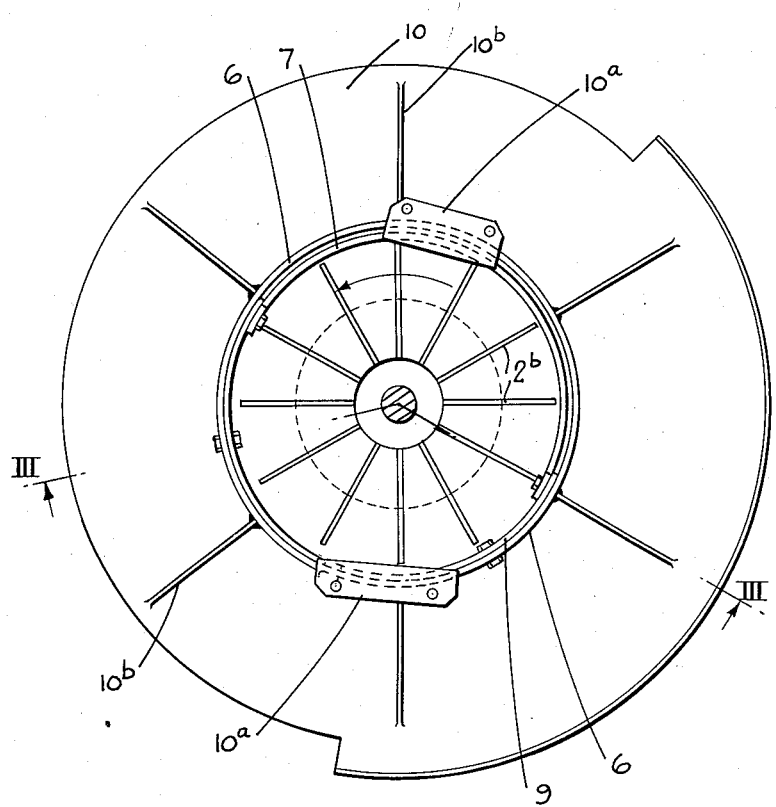

SPINNERS FOR USE IN DISTRIBUTING GRANULAR MATERIALS

Filed Dec. 27, 1957        4 Sheets-Sheet 2

Inventor
H.J.B.Topp
By Glascock Downing Feebold
Attys.

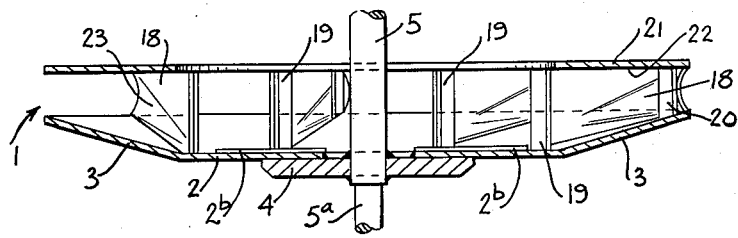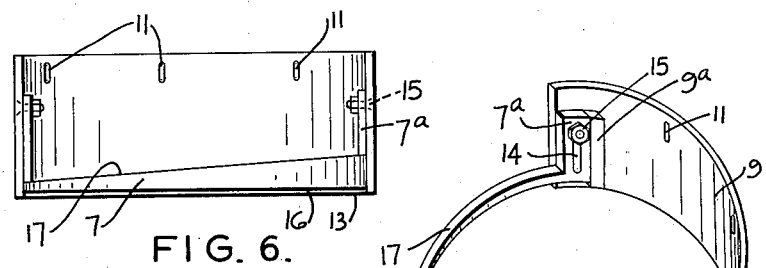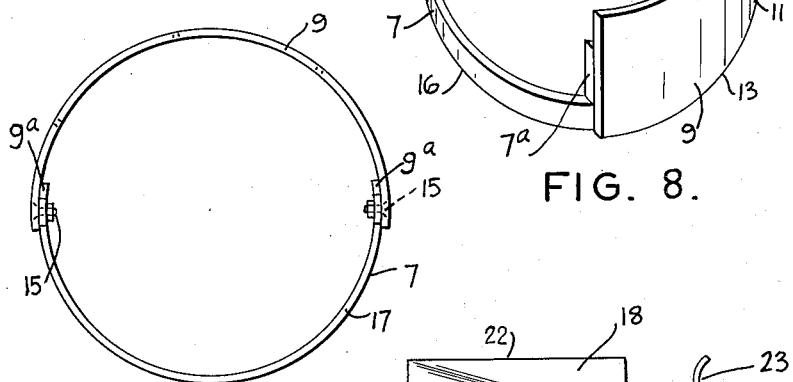

Jan. 10, 1961  H. J. B. TOPP  2,967,604
SPINNERS FOR USE IN DISTRIBUTING GRANULAR MATERIALS
Filed Dec. 27, 1957  4 Sheets-Sheet 4

INVENTOR
H. J. B. TOPP

ATTORNEYS

United States Patent Office 2,967,604
Patented Jan. 10, 1961

2,967,604

SPINNERS FOR USE IN DISTRIBUTING GRANULAR MATERIALS

Hereward J. B. Topp, Hatuma R.D., Waipukurau, Hawkes Bay, New Zealand

Filed Dec. 27, 1957, Ser. No. 705,566

17 Claims. (Cl. 198—128)

This invention relates to spinners for use in scattering or distributing granular material such as lime, over the ground.

An object of this invention is to provide an improved spinner of simple construction, and to which loose granular material can be fed, whereby the granular material is scattered or distributed in desired evenness and thickness over the ground and in a controlled quantity.

A further object of this invention is to provide an improved spinner for use in scattering and distributing loose granular material and one which can deal with and scatter moisture-laden granular material such as lime, without excessive building up or depositing of the granular material on parts of the spinner and without blocking the spinner for scattering and distributing of the loose granular material, and a spinner particularly suited for use in the top-dressing of hill country with lime, with the aid of a crawler tractor.

According to this invention, the improved spinner comprises a receiving plate forming a central piece of a rotatably mounted scattering means, a stationary dividing wall between the receiving plate and the scattering means, and an adjustable part of the dividing wall arranged to give access from the receiving plate to the scattering means at a position so that material is scattered when required from the scattering means when in operation.

The invention will now be described with reference to the accompanying drawings in which:

Figure 1 is an elevation of the spinner,

Figure 2 is a plan view of Figure 1,

Figure 5 is a cross-sectional elevation on line V—V of Figure 4,

Figure 6 is an elevation of the adjustable part and tapered weir,

Figure 7 is a plan view of Figure 6,

Figure 8 is a perspective view of Figure 6,

Figure 9 is an elevation of a vane,

Figure 10 is an end view of Figure 9,

Figure 3:
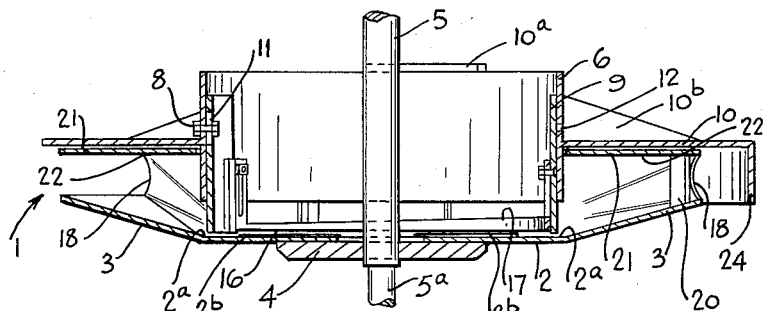
Figure 3 is a cross-sectional elevation on line III—III of Figure 2.

Referring to the drawings the receiving plate 2 is in the form of a disc which is supported and turned by a driven vertical shaft 5. The receiving plate 2 forms a central part of the scattering means indicated generally at 1, so that material fed anywhere on to the receiving plate 2 passes to and is forced beyond the periphery of the receiving plate 2 to enter other parts of the scattering means 1 as the material is confined to the scattering means 1 by an adjustable part 9 of the dividing wall 6. The diameter of the receiving plate 2 is equal to at least half the diameter of the dish of the scattering means 1. (See Figures 1, 2, 3 and 5.)

A dividing wall 6 with an adjustable part 9 is arranged perpendicularly to the receiving plate 2, and an arcuate tapered weir 7 is adjustably attached to the adjustable part 9 as shown in Figures 6, 7 and 8. Mounting flanges 10a are attached by means such as welding to the upper edge of the dividing wall 6, and fillets 10b are provided between the dividing wall 6 and cover plate 10, as shown in Figures 1 and 2. The adjustable part 9 is adjustably attached by fixing means such as bolts 8 to the dividing wall 6 of the cover plate 10, said cover plate 10 being arranged over the scattering means 1 as shown in Figures 3 and 5. The bolts 8 are engaged in vertical slots 11 (see Figures 6 and 8) of the adjustable part 9 and also in horizontal slots 12 of the dividing wall 6 (see Figure 1) so that the adjustable part 9 can be adjusted vertically and circumferentially in relation to the receiving plate 2. The adjustable part 9 is arranged as an adjustable shutter and the lower edge 13 of the adjustable part 9 is machined to fit closely on the upper surface of the receiving plate 2 so that adjustment of the adjustable part 9 in its vertical slots 11 can be made to effect a complete blocking off of material passing from the receiving plate 2 to outer sloping sides 3 or outer peripheral portion of the scattering means 1, the receiving plate 2 and the outer sloping sides 3 forming a dished lower plate.

The tapered weir 7 has vertical slots 14 (see Figures 3 and 8) provided in its ends 7a and the slots 14 engage over studs 15 welded to the adjustable part 9, the ends 7a being guided by vertical strips 9a on the adjustable part 9 so that the weir 7 is vertically adjustable in relation to the adjustable part 9 and the receiving plate 2. The tapered weir 7 is arranged with its upper tapered edge 17 decreasing in height in the direction of rotation of the driven shaft 5 and the receiving plate 2, and the outside face of the weir 7 is arranged so as to be slightly inside the periphery of the receiving plate 2 to form an annular outer ledge 2a, being an outer part of the receiving plate 2 adjacent the outer sides 3.

Hence material to be scattered is passed from the receiving plate 2 to the sloping sides 3 either under the lower horizontal edge 16 of the weir 7 which assures an even spread of material to the sloping sides 3, or over the upper tapered edge 17 of the weir 7 which edge 17 being tapered in the direction of rotation of the shaft 5 and plate 2 assists in the even spread of material to be scattered, or by adjustment of the weir 7 in its slots 14 material can be passed under and over the weir 7 simultaneously. Material passing over the upper tapered edge 17 falls to the outer ledge 2a of the plate 2 before passing to the sloping sides 3, thus avoiding a build-up of material which tends so to do when there is no gap between the weir, the adjustable part 9 and the inner end of the vanes 18 (see Figure 3).

Figure 4:
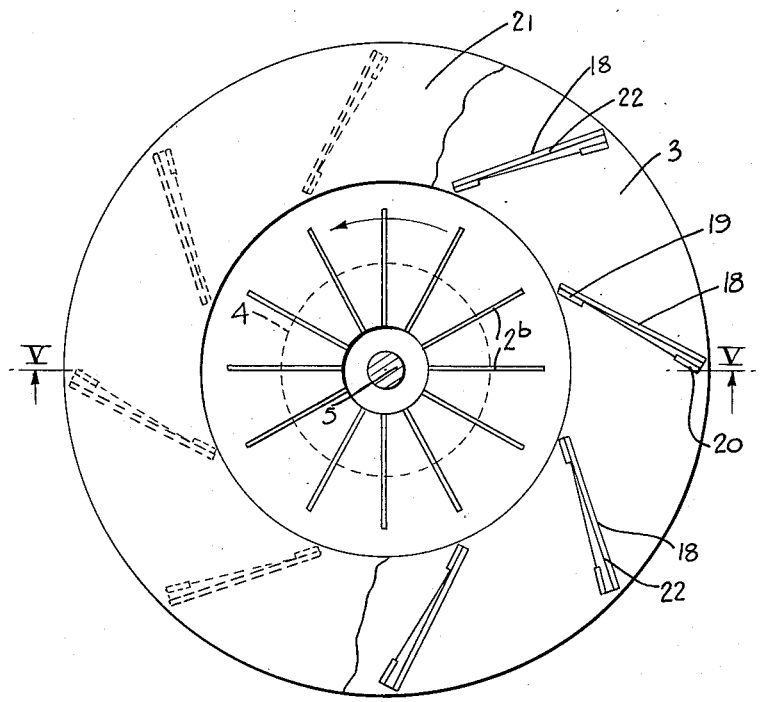
Figure 4 is a plan view (partly broken) of the scattering means.

The scattering means 1 has walls in the form of vanes 18 arranged on the sloping sides 3, and vanes 18 being attached on their rear faces by means such as welding to inner struts 19 and outer struts 20 as shown in Figure 4.

In a preferred form as shown in the drawings (see Figures 3, 4 and 5), the vanes 18 are tangentially disposed on the sloping sides 3, and an upper plate 21 is arranged to cover horizontal upper edges 22 of the vanes 18, the upper plate 21 being attached by means such as welding to the inner and outer struts 19 and 20 respectively.

In a further form of the invention (not shown) the vanes 18 may be radially disposed, or in a still further form (not shown) the vanes 18 may be arcuate in formation on the sloping sides 3. Each vane 18 is formed with a concave front face 23 along which the loose material is forced centrifugally to travel as the scattering means 1 is revolved horizontally on the driven shaft 5, so that the loose material as it travels along the vanes 18 is confined to the concave front face 23 until it is discharged from the outer ends of the vanes 18.

The receiving plate 2 is attached by means such as welding to a bearing plate 4 welded to a driven vertical shaft 5 as shown in Figures 3 and 5, and the lower portion 5a of the shaft 5 is supported in bearings (not shown).

Figure 11:
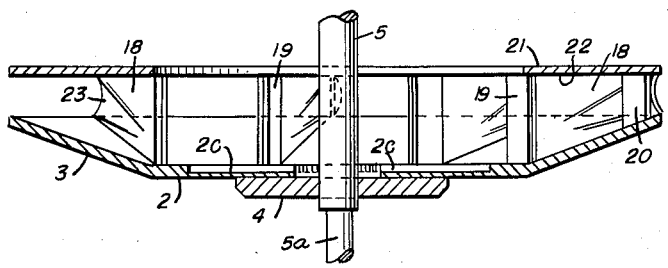
Figure 11 is a cross-sectional view on line II—II of Figure 12.
Figure 12:
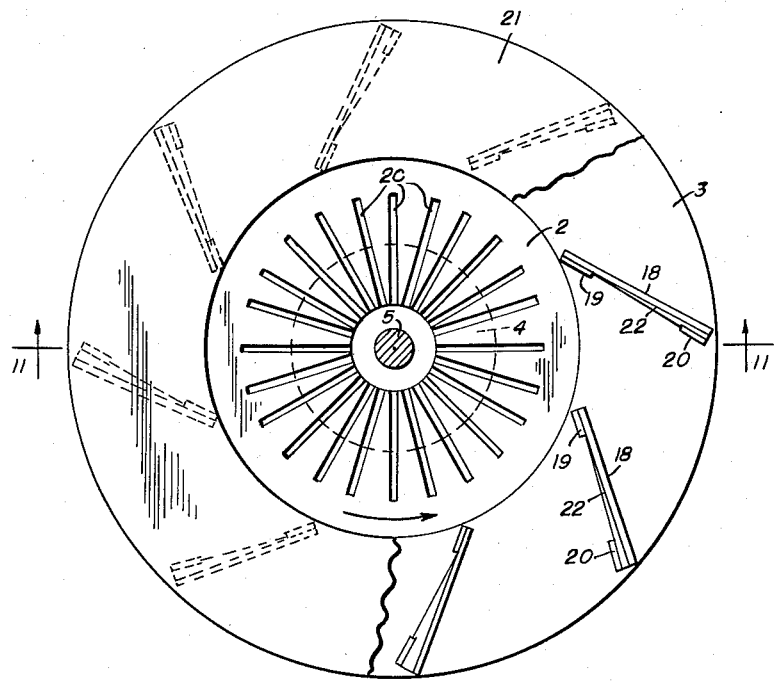
Figure 12 is a plan view (partly broken away) of the scattering means, and showing the receiving plate having grooves therein.

The receiving plate 2 is roughened on its upper surface by the provision of radiating ribs or ridges 2b as shown in Figures 2, 3, 4 and 5, such roughened upper surface of the receiving plate 2 preventing the latter from slipping round under the material fed anywhere thereon. In Figures 11 and 12 is shown a further form of the receiving plate 2 wherein the roughening of the upper surface thereof can be effected by studs (not shown) or by radially disposed grooves 2c (as shown in Figures 11 and 12).

The loose material fed anywhere on to the upper surface of the receiving plate 2 is passed by centrifugal force towards the outer ledge 2a of the receiving plate 2 as the latter is revolved by the driven shaft 5 and the material passes by the tapered weir 7 as previously described to the outer ledge 2a, and as the scattering means is revolved by the driven shaft the loose material is picked up by the inner ends of the vanes 18 and passed along the concave front face 23 of the vanes 18 and the loose material is scattered or distributed in a wide area from the scattering means, when the latter is revolved in the direction of the arrow shown in Figures 2 and 4 at approximately 500 revolutions per minute.

As shown in Figures 1, 2 and 3, a downwardly extending flange 24 is provided around part of the periphery of the cover plate 10, a gap being left between the outer ends of the vanes 18 and the flange 24 so as to prevent a build up of material, and the flange 24 preventing the scattering and distribution of any loose material where not required, where the spinner through maladjustment or wear and tear of the parts or by air draught permits material to be carried to this portion of the spinner.

With the vanes 18 shaped as illustrated in Figures 3, 5 and 8 and situated between the sloping sides 3 and upper plate 21, the loose material is subjected to a venturi effect as it is picked up by the inner ends of the vanes 18 and passed to the outer ends of the vanes 18, and as the loose material leaves the scattering means 1 it is forced in a wide arc, up to 215° from the centre line of the driven shaft 5, and by this construction of the improved spinner as hereinbefore described, there is a restriction of the amount of air taken in and passed through the scattering means 1 to enhance the venturi effect on the loose material as it is fed to and passed through the scattering means 1 as the latter is revolved by the driven shaft 5.

It is desirable in this form of the improved spinner that with reference to the receiving plate 2, the diameter of the latter should not be less than 10″ in diameter and with reference to the vanes 18 there should be at least six vanes 18 to ensure an even and continuous spread of loose material.

In an anti-clockwise rotation of the receiving plate 2 and vanes 18 the flange 24 of the cover plate 10 is arranged so that material will not be scattered where not required, but the relationship of the adjustable part 9 and the weir 7 to the flange 24 is such that with material to be scattered being supplied anywhere on to the receiving plate 2 then the material is allowed to pass to the vanes 18 when the vanes 18 pass the adjustable part 9, and the material then passing from the receiving plate 2 to the weir 7 is picked up by the vanes 18 which commence to scatter the material as the vanes 18 pass the end of the flange 24 and the material continues to pass by the weir 7 to the vanes 18 until the end of the weir 7 is reached and the adjustable part 9 blocks off the supply of material to the vanes 18, but the scattering of material on the sloping sides 3 is continued by the vanes 18 until the vanes 18 pass the other end of the flange 24 and then the vanes 18 are again supplied with material as their inner ends become open to or adjacent to the weir 7 again.

Hence by this invention there is provided an improved spinner of simple construction, to which loose material can be fed, and whereby the loose material is distributed and scattered in desired evenness and thickness over the ground in a controlled quantity.

What I do claim and desire to obtain by Letters Patent of the United States of America is:

1. An improved spinner comprising a rotatably mounted scattering means, said scattering means including a receiving plate forming a central part and an outer peripheral portion, mounting means, a dividing wall attached to the mounting means and arranged to remain in a stationary position between the receiving plate and the outer peripheral portion, and an adjustable part on the dividing wall having a weir-shaped member adjustably attached thereto and arranged to give access from the receiving plate to the outer peripheral portion at a position so that material is scattered where required from the scattering means when in operation.

2. A spinner as claimed in claim 1, wherein the receiving plate has a diameter equal to at least half the total diameter of said receiving plate and outer peripheral portion.

3. A spinner as claimed in claim 1, further including a cover plate, the dividing wall having mounting flanges and fillets being provided between the dividing wall and the cover plate.

4. A spinner as claimed in claim 1, wherein the adjustable part of the dividing wall is adjustably attached by fixing means to the dividing wall, and a cover plate of the dividing wall is arranged over the receiving plate and outer peripheral portion.

5. A spinner as claimed in claim 1, wherein the adjustable part of the dividing wall has vertical slots and the dividing wall has horizontal slots so that the adjustable part can be adjusted vertically and circumferentially in relation to the receiving plate.

6. A spinner as claimed in claim 1, wherein the adjustable part of the dividing wall is arranged as an adjustable shutter and the lower edge of the adjustable part fits closely on the upper surface of the receiving plate so that adjustment of the adjustable part can be made vertically to effect a complete blocking off of material passing from the receiving plate to the outer peripheral portion.

7. A spinner as claimed in claim 1, wherein the weir shaped member is tapered and arcuate in form and has vertical slots provided in its ends and the slots engage over studs of the adjustable part of the dividing wall, and the said ends being guided by vertical strips on the adjustable part so that the weir is vertically adjustable in relation to the adjustable part and the receiving plate.

8. A spinner as claimed in claim 1, wherein the weir is tapered and arranged with its upper tapered edge decreasing in height in the direction of rotation of a driven shaft and the receiving plate, and the outside face of the weir is arranged so as to be slightly inside the periphery of the receiving plate to form an annular outer ledge.

9. A spinner as claimed in claim 1, wherein the outer peripheral portion includes sloping sides and has radiating walls in the form of vanes arranged thereon, inner struts and outer struts attached on the rear faces of the vanes, and an upper plate above the vanes to which the inner and outer struts are attached.

10. A spinner as claimed in claim 1, wherein the outer peripheral portion has sloping sides and walls in the form of vanes which are tangentially disposed on the sloping sides, and an upper plate is arranged to cover the horizontal upper edges of the vanes.

11. A spinner as claimed in claim 1, wherein the outer peripheral portion has vanes and each vane is formed with a concave front face along which material is forced to travel centrifugally as the scattering means is revolved horizontally on a driven shaft so that the material travels along the vanes and is confined to the concave front face until it is discharged from the outer end of the vanes.

12. A spinner as claimed in claim 1, wherein the outer peripheral portion has sloping sides and vanes are situated between the sloping sides and an upper plate so that loose material forced along the vanes is subjected to a venturi effect as it is picked up by the inner ends of the vanes and passed to the outer ends of the vanes whereby loose material leaves the scattering means and is forced in a wide arc up to 215° from the center line of a driven shaft and whereby there is a restriction of the amount of air taken in and passed through the scattering means to enhance the venturi effect on the loose material as it is fed to and passed through the scattering means.

13. A spinner as claimed in claim 1, further including a cover plate, the dividing wall having mounting flanges, fillets between the dividing wall and the cover plate, vanes on the outer peripheral portion, the cover plate having a downturned flange and the relationship between said downturned flange and the adjustable part and the weir-shaped member in an anti-clockwise rotation of the receiving plate and vanes, being such that the downturned flange is arranged so that material will not be scattered where not required, and with material to be scattered being supplied anywhere on to the receiving plate then the material is allowed to pass to the vanes when the vanes pass the adjustable part and the material then passing from the receiving plate to and by the weir-shaped member is picked up by the vanes which commence to scatter the material as the vanes pass the end of the flange and the material continues to pass by the weir-shaped member to the vanes until the end of the weir-shaped member is reached and the adjustable part blocks off the supply of material to the vanes, but the scattering of material on the outer peripheral portion is continued by the vanes until the vanes pass the other end of the flange and then the vanes are again supplied with material as their inner ends become open to or adjacent to the weir-shaped member again.

14. A spinner as claimed in claim 1, wherein the receiving plate is roughened on its upper surface by the provision of radiating ribs so that the receiving plate is prevented from slipping round under material fed anywhere thereon.

15. A spinner as claimed in claim 1, wherein the receiving plate is roughened on its upper surface by the provision of grooves.

16. A spinner as claimed in claim 1, wherein the outer peripheral portion is provided with sloping sides and vanes are radially disposed on said sloping sides.

17. A spinner as claimed in claim 13, wherein the vanes of the sloping sides are arcuate in formation on the sloping sides.

References Cited in the file of this patent

UNITED STATES PATENTS

| 2,766,872 | Pillsbury | Oct. 16, 1956 |

FOREIGN PATENTS

| 621,947 | Great Britain | Apr. 22, 1949 |
| 159,534 | Australia | Oct. 29, 1954 |
| 1,495 | Australia | Apr. 19, 1926 |